Patented Feb. 3, 1948

2,435,542

UNITED STATES PATENT OFFICE 2,435,542

WAX ACIDS SEPARATION PROCESS

Frederick G. Hess, Merchantville, N. J., assignor to Cities Service Oil Company, New York, N. Y., a corporation of Pennsylvania No Drawing. Application May 17, 1946, Serial No. 670,540

19 Claims. (Cl. 260—452)

This invention relates to the oxidation of hydrocarbons, and more especially to an improved process for refining a crude mixture of oxygen-containing compounds of varying nature and composition.

The product which results from the controlled oxidation of waxes, petrolatum and similar hydrocarbons is essentially a mixture of organic acids and alcohols, aldehydes, ketones and possibly lactones and lactides, of various kinds and carbon content, together with a small amount of unreacted starting material. In some instances the whole mixture, which, for want of a better term, is usually called "crude wax acids" may be employed to good advantage without further refinement. It is frequently desirable, however, to separate at least some of the constituents of the mixture from others in order to obtain a product of particular utility or to increase the economic yield of the oxidation process.

The conventional method of stripping the hydroxy acids from a mixture of this kind, for example, involves the treatment of the crude wax acids with naphtha for the purpose of separating out the essentially insoluble portion of the hydroxy acids and of then precipitating the naphtha soluble portion from the resulting solution with ortho-phosphoric acid. This separatory method is objectionable from the standpoint of the long time which is required to effect substantially complete precipitation. Thus all of the naphtha soluble hydroxy acids cannot be knocked down in a single dump. On the contrary, the naphtha solution must be treated repeatedly with small volumes of ortho-phosphoric acid, and allowed to stand for a period of about two hours between each dump for the settling out of a very fine precipitate which is formed. It is usually necessary, for example, to repeat the treatment four or five times in order to effect substantially complete elimination of the precipitatable matter. A further objection arises from the fact that the phosphoric acid must be recovered if the method is to be practiced on an economical basis. This is usually effected by water washing, which gives rise to the formation of troublesome emulsions, the need for reconcentrating the recovered acid, and various incidental problems which add both to the cost and the time consumed in carrying through the process effectively.

The principal object of the present invention is to provide a method for separating the hydroxy acids from crude wax oxidation products which is more effective, less time-consuming, and generally cheaper in other respects than the phosphoric acid precipitation method mentioned above, or any other known prior art process for effecting a similar separation.

In accordance with the invention, the crude wax acids are first cut with naphtha in the ratio of about 1:10 by volume for the purpose of separating that portion of the hydroxy acid content which is essentially insoluble in this solvent. Generally speaking, about 5 to 6 per cent of the oxidation products may be separated out in this fashion. The naphtha soluble hydroxy acids are then precipitated from the solution by treating the latter with zinc chloride. For this purpose I prefer to use an aqueous solution containing from about 60-75 per cent by weight of zinc chloride so that all of the precipitatable hydroxy acid material may be thrown down in a single dump, and in a minimum period of time. It is entirely practicable, however, to use less concentrated zinc chloride solutions, in which case the precipitation time will be correspondingly lengthened, and in some cases two or three more dumps may be required to effect complete hydroxy acid separation.

In carrying out the process with 75 per cent strength zinc chloride solution it has been noted that a fairly heavy precipitate is formed, most of which settles out within a very few minutes. Some of the finer matter, however, tends to remain in suspension, and if it is to be separated out by gravity the solution should be permitted to stand for a period of about two hours before the lower hydroxy-acid containing layer is drawn off. This precipitate is usually found to contain from 15 to 20 per cent by weight of the original crude wax acids together with substantially all of the added zinc chloride. In the event that the value of these oxidation products warrants their recovery, this may be done by treating the precipitate with water, giving rise to the formation of a heavy zinc chloride layer which may readily be drawn off leaving the hydroxy acids for such further refinement as may be called for.

It will be appreciated that the precipitant is an essentially inexpensive material, and is employed in such small quantities in carrying out this process as hardly to warrant the expenditure of very much effort in its recovery. Obviously, however, the zinc chloride solution which is separated from the hydroxy acid material as described above may be reconcentrated for further use in the process, or it may be employed in dilute or concentrated form for any other need which may arise.

In carrying out the precipitation step I have not found it practicable to effect the complete elimination of all of the added zinc chloride by gravity separation. At the end of the two or three hour settling period, for example, it appears that a very small amount of the chloride remains in suspension in the naphtha layer. In order to minimize the process time thereof I have generally found it preferable to draw off the zinc chloride hydroxy acid precipitate after the solution has stood for an hour or two, and then to treat the naphtha layer with a small quantity of phosphoric acid for the purpose of eliminating the last traces of zinc chloride. In general I have found that from one to two per cent of phosphoric acid, with respect to the weight of the entire body of crude wax acids under treatment, suffices to break the suspension so that both the zinc chloride and the inorganic acid fall to the bottom of the naphtha solution where they may be readily drawn off. The trace of phosphoric acid which remains in the solution may then be precipitated with magnesium oxide, which is added in the proportion of about 1 per cent of the weight of the original crude wax acid sample. It may be noted that even this small amount of magnesium oxide is probably excessive. In any event this material is allowed to settle with the phosphoric acid to form a layer which is drawn off, leaving a clean solution from which the naphtha may be flashed and recovered for reuse.

The product recovered from the naphtha solution is a mixture of hydroxy-acid-free wax acids together with the remainder of the alcohols, aldehydes and other oxidation constituents of the crude wax acids which were not removed with the hydroxy acids. In general I have found that it represents from 75 to 85 per cent of the weight of the crude oxidation products subjected to the foregoing separatory process, and for want of a better term I usually refer to it as a "carboxylic acids mixture". The exact nature of the mixture, as well as the quantity recovered, will depend upon the source and character of the crude oxidation products, the manner in which they were prepared, and other factors which are well understood in the art. This mixture may be converted to metal salts for use as oil addition agents in the manner set forth in copending application entitled "Oil addition agents," filed on May 4, 1946, under Serial No. 667,470, of which I am a co-inventor, or for any other suitable purpose. If desired, however, the carboxylic acids mixture may be further refined to concentrate the organic acid constituents and separate them from the other oxidation products.

Further details as to my new method and the manner in which it may be practiced are brought out in the following examples:

*Example I*

The starting product for this example process was prepared by blowing molten scale wax having an M. P. of 122°–126° F. with air at substantially atmospheric pressure, at a temperature of from 300 to 315° F. for a period of about 18 hours. In the course of the ensuing reaction, substantially all of the hydrocarbons were oxidized to a greater or lesser extent to give a final product consisting of organic acids, aldehydes, esters, ketones, and possibly lactides and lactones, together with a small percentage of unreacted wax. This particular mixture proved to have a neutralization number of about 48 and a saponification number of approximately 106.

In applying my method to the refining of this mixture I first treated a 100 gram sample of the crude wax acids with about 1000 cc. of straight run naphtha having a boiling range of 150–250° F., i. e., in a volumetric ratio of ten parts of solvent to one part of oxidation product. The naphtha insoluble layer which was drawn off to the extent of about 11 cc. was found to contain approximately 4 grams of wax oxidation products consisting principally of hydroxy acids, and to a much lesser extent, of alcohols, aldehydes, etc. These products may of course be recovered for use as is, or as a subject for further separation or refinement.

The naphtha layer resulting from the foregoing treatment contained about 96 grams of dissolved oxidation products including some considerable proportion of hydroxy acids. In accordance with the invention this solution was treated with about 12 grams of zinc chloride in aqueous solution with 4 grams of water, giving rise to the formation of a heavy precipitate which tended to settle out rather rapidly. In the case under discussion, the naphtha solution was allowed to stand for a period of about two hours following this treatment in order to obtain a maximum settling out of the zinc chloride and precipitated matter. The heavy layer which was drawn off at the end of the settling period, representing about 25 cc., was found to contain substantially all of the added zinc chloride together with about 11 grams of hydroxy acids and alcohols, ketones, etc. This mixture may be divided into its essential components by treatment with water, giving rise to the dissolution of the zinc chloride which may then be drawn off from the black layer of hydroxy acid materials. The latter product may then be subjected to such further refinement as may be desired while the zinc chloride may be discarded or recovered as the facts may warrant.

In order to test the effectiveness of the foregoing treatment a small sample of the naphtha layer was drawn off, and treated with aqueous zinc chloride. This treatment produced no further precipitation of wax oxidation products, thus demonstrating that the concentrated chloride solution accomplished its purpose in a single dump. The entire solution of hydroxy acid-free oxidation products was accordingly treated with about 1 cc. of ortho phosphoric acid, i. e., about 2 per cent by weight of the original wax acid sample, to throw down the very small amount of zinc chloride which remained in suspension, and I then added about one gram of magnesium oxide for the purpose of eliminating any dissolved phosphoric acid. It will be evident that neither the phosphoric acid nor the magnesium oxide is employed in sufficient quantity to warrant recovery. At the same time, however, it will be recognized that in a very large scale process either or both of these treating materials may be separated out and purified for reuse in this process or for any other purpose.

Upon the complete elimination of the phosphoric acid-zinc chloride-magnesium oxide layer, the naphtha was flashed from the solution and recovered for reuse, leaving approximately 85 grams of wax oxidation products consisting essentially of carboxylic acid and the remainder of alcohols, esters, ketones which were not abstracted with the hydroxy acids. This carboxylic acids mixture may be used as is, or may be subjected to further refinement for the purpose of separating out its individual components.

Example II

In those cases in which the hydroxy acids which are separated from the crude wax oxidation products in accordance with my invention, are to be subjected to further refinement for the purpose of concentrating the acids and separating out alcohols, etc., I prefer to vary the foregoing process in its initial steps. This alternative method may be considered in its application to the refinement of a 100 gram sample of crude wax acids which were prepared by blowing molten scale wax, in the manner and at the temperatures mentioned in Example I, for a period of about 28½ hours, to obtain a mixture having a neutralization number of about 67.5. As a first step in the refinement process, the wax acids sample was dissolved in 250 cc. of straight run Pennsylvania naphtha of the kind previously mentioned, i. e., in the ratio of about 2½ volumes of solvent to each volume of oxidation products. This degree of dilution was so small as to produce no appreciable separation of hydroxy acids. The solution was then treated with 5.5 cc. of a 3 normal nitric acid solution giving rise to the formation of a heavy black floc representing approximately 0.5 per cent by weight of the original wax acids sample which was drawn off with the nitric acid and water, and discarded.

The naphtha solution was then dried by filtration, although it will be evident that any other desired procedure may be followed in eliminating traces of water remaining from the acid treatment. When this clean solution was further diluted with 750 cc. of naphtha, a small amount of essentially insoluble hydroxy acids precipitated out, and was separated from the main solution. The 11 cc. which was drawn off as a precipitate was found to contain approximately five grams of wax oxidation products consisting primarily of hydroxy acids together with a small fraction of alcohols, aldehydes, ketones, etc. These oxidation products may readily be separated from the naphtha and other constituents of the precipitate, leaving a clear, dark amber mixture from which the individual components may be extracted.

The solution of naphtha soluble oxidation products was then treated with a 66 per cent solution of zinc chloride (12 grams of zinc chloride in 6 grams of water) for the purpose of precipitating about 19.3 grams of naphtha soluble hydroxy acids. Since this step and the other which followed in the recovery of about 75.2 grams of "carboxylic acids" end product were carried out in precisely the manner described in Example I, detailed description of them seems unnecessary.

It will be observed that smaller amounts of hydroxy acids were separated from the crude acids in the first example, than was the case in the second one, a result which follows from the difference in the nature of the starting products and not from any fundamental difference in the separatory process itself. In these examples I was endeavoring to obtain a maximum yield of "carboxylic acids mixture," and I used a starting material in which these products predominated. In other cases, however, the hydroxy acids may be the products of primary interest, in which event the starting material would be prepared with that objective in mind. Whatever the character of the starting material, however, I have found that my process is fully effective in separating the hydroxy acids from the remaining materials. Thus it is not limited to the refinement of oxidation products of the particular grade of scale wax mentioned in the examples, but on the contrary, is equally applicable to the separation of the hydroxy acid constituents of crude wax acids produced by the oxidation of petrolatum, various grades of paraffin and naphthenic petroleum waxes, and waxy products of other origin, whether produced by the precise process which has been described or any of the other oxidation processes which are well known in the art.

Having described my invention in its broader aspects and illustrated it by way of specific examples, what I claim as new and useful is:

1. The process of refining wax acids which comprises the step of treating a naphtha solution of oxidation products of waxy material with zinc chloride to precipitate naphtha soluble hydroxy acids therefrom.

2. The process of refining wax acids which comprises the steps of treating a mixture of oxidation products of waxy materials with naphtha, and of adding zinc chloride to the resulting solution in such amount as to precipitate naphtha soluble hydroxy-acid products therefrom.

3. The process of refining wax acids which comprises the steps of treating a mixture of oxidation products of waxy materials with naphtha, and of adding an aqueous solution of zinc chloride to the resulting solution in such amount as to precipitate naphtha soluble hydroxy-acid products therefrom.

4. The process of refining wax acids which comprises the steps of treating a naphtha solution of oxidation products of waxy material with an aqueous solution containing from 60 to 75 per cent of zinc chloride, and separating the zinc chloride-naphtha soluble hydroxy acid precipitate from the naphtha solution.

5. The process of refining wax acids which comprises the steps of treating a naphtha solution of oxidation products of waxy material with an aqueous solution of zinc chloride in such proportions as to precipitate hydroxy-acid therefrom, separating the precipitate, and treating the naphtha solution with phosphoric acid to remove suspended zinc chloride.

6. The process of refining wax acids which comprises the steps of treating a mixture of oxidation products of waxy material with naphtha in such proportion as to effect a separation of a part of its hydroxy acid content, and adding an aqueous solution of zinc chloride to the resulting naphtha solution to precipitate naphtha soluble hydroxy acids therefrom.

7. The process of refining wax acids which comprises the steps of treating a mixture of oxidation products of waxy material with naphtha in the ratio of about ten volumes of solvent for each volume of oxidation products, separating the precipitate from the resulting solution, and adding an aqueous solution of from about 60 to 75 per cent strength zinc chloride to the naphtha solution to precipitate hydroxy acids therefrom.

8. The process of refining wax acids which comprises the steps of treating a mixture of oxidation products of waxy material with naphtha in such proportion as to precipitate a part of the oxidation products, separating the precipitate from the naphtha solution, and adding an aqueous solution of zinc chloride of at least 60 per cent strength to such naphtha solution to effect a precipitation of a further portion of such oxidation products.

9. The process of refining wax acids which comprises the steps of treating a mixture of oxidation products of waxy material with naphtha in such proportion as to precipitate a part of the oxidation products, separating the precipitate from the naphtha solution, adding an aqueous solution of zinc chloride of at least 60 per cent strength to such naphtha solution to effect further precipitation of oxidation products, separating the zinc chloride-oxidation product precipitate from the naphtha solution, and treating the latter with phosphoric acid to precipitate the remainder of the added zinc chloride.

10. The process of refining wax acids which comprises the steps of treating a mixture of oxidation products of waxy material with naphtha in such proportion as to precipitate a part of the oxidation products, separating the precipitate from the naphtha solution, adding an aqueous solution of zinc chloride of at least 60 per cent strength to such naphtha solution to effect further precipitation of oxidation products, separating the zinc chloride-oxidation product precipitate from the naphtha solution, treating the latter with phosphoric acid to precipitate the remainder of the added zinc chloride, and adding a trace of magnesium oxide to the naphtha solution to remove traces of phosphoric acid.

11. The process of refining wax acids which comprises the steps of treating a mixture of oxidation products of waxy material with naphtha in the ratio of about 1:10 by volume, separating out any precipitated oxidation products, treating the naphtha solution with a 60–75 per cent strength aqueous solution of zinc chloride in such proportions as to effect substantially complete precipitation of hydroxy acid constituents, and separating the zinc chloride-hydroxy acid precipitate from said naphtha solution.

12. The process according to claim 11 characterized by precipitating suspended zinc chloride from said naphtha solution with phosphoric acid.

13. The process of refining wax acids which comprises the steps of treating a mixture of oxidation products of waxy material with naphtha in such proportions as to effect substantially no oxidation product precipitation, treating the resulting naphtha solution with nitric acid solution to the extent of about 5 per cent of the volume of the oxidation products, separating the resulting precipitate, diluting the naphtha solution with further naphtha in such proportion as to precipitate a portion of the oxidation products, separating the resulting precipitated matter, and treating the naphtha solution with zinc chloride to precipitate a further portion of oxidation products.

14. The process of refining wax acids which comprises the steps of treating a mixture of oxidation products of waxy material with naphtha in such proportions as to effect substantially no oxidation product precipitation, treating the resulting naphtha solution with nitric acid solution to the extent of about 5 per cent of the volume of oxidation products, separating the resulting precipitate, diluting the naphtha solution with further naphtha in such proportion as to precipitate a portion of the oxidation products, separating the resulting precipitated matter, and treating the naphtha solution with a 60–75 per cent strength aqueous solution of zinc chloride in such proportion as to effect substantially complete elimination of zinc chloride precipitate oxidation products.

15. The process of refining wax acids which comprises the steps of treating a mixture of oxidation products of waxy material with naphtha in the ratio of about 1:2.5 by volume, adding a 3 Normal solution of nitric acid, separating the nitric acid-oxidation product precipitate, diluting the naphtha solution with further naphtha to give a final concentration of about one volume of oxidation products to ten volumes of solvent, separating out any precipitated oxidation products, and treating the naphtha solution with a 60–75 per cent strength aqueous solution of zinc chloride to precipitate naphtha soluble hydroxy acids.

16. The process of refining wax acids according to claim 15 characterized in that said zinc chloride solution is added in such proportion as to effect substantially complete hydroxy acid precipitation in a single dump.

17. The process of refining a mixture of oxidation products obtained by blowing paraffin wax with air which comprises the steps of treating such oxidation products with naphtha in such volume as to effect a precipitation of a part of the oxidation products, separating out the precipitated matter, and treating the resulting naphtha solution with a 60–75 per cent strength aqueous solution of zinc chloride to effect precipitation of a portion of the naphtha soluble oxidation products.

18. The process of refining a mixture of oxidation products obtained by blowing paraffin wax with air, which comprises the steps of treating such oxidation products with naphtha in the ratio of about one to ten by volume, separating the resulting precipitate from the naphtha solution, treating the naphtha solution with a 60–75 per cent strength aqueous solution of zinc chloride in such proportion as to effect substantially complete precipitation of oxidation products responding to this treatment in a single dump, separating the zinc chloride-oxidation product precipitate from the naphtha solution, and recovering the dissolved oxidation products by evaporating off the naphtha.

19. The process of refining wax acids which comprises the steps of treating a mixture of oxidation products of waxy materials with naphtha, and of adding an aqueous solution of zinc chloride of at least 60 per cent strength to the resulting naphtha solution in such proportions as to precipitate substantially all hydroxy acids therefrom.

FREDERICK G. HESS.

REFERENCES CITED

The following references are of record in the file of this patent:

UNITED STATES PATENTS

| Number | Name | Date |
| --- | --- | --- |
| 2,038,617 | Vesterdal | Apr. 28, 1936 |

FOREIGN PATENTS

| Number | Country | Date |
| --- | --- | --- |
| 489,938 | Germany | Jan. 25, 1930 |